US012563652B2

(12) United States Patent
Huang et al.

(10) Patent No.: US 12,563,652 B2
(45) Date of Patent: Feb. 24, 2026

(54) CHARGE AND DISCHARGE BALANCING CIRCUIT AND LED DRIVE SYSTEM

(71) Applicant: Shenzhen Obuy Technology Co., Ltd, Shenzhen (CN)

(72) Inventors: Mingxue Huang, Shenzhen (CN); Le Jiang, Shenzhen (CN); Xuefeng Lu, Shenzhen (CN); Jin Liu, Shenzhen (CN)

(73) Assignee: Shenzhen Obuy Technology Co., Ltd, Shenzhen (CN)

( * ) Notice: Subject to any disclaimer, the term of this patent is extended or adjusted under 35 U.S.C. 154(b) by 120 days.

(21) Appl. No.: 18/390,433

(22) Filed: Dec. 20, 2023

(65) Prior Publication Data

US 2025/0133639 A1 Apr. 24, 2025

(30) Foreign Application Priority Data

Oct. 19, 2023 (CN) ......................... 202311373571.5

(51) Int. Cl.
*H05B 45/34* (2020.01)
*H05B 45/35* (2020.01)
*H05B 45/375* (2020.01)

(52) U.S. Cl.
CPC ............ *H05B 45/35* (2020.01); *H05B 45/34* (2020.01); *H05B 45/375* (2020.01)

(58) Field of Classification Search
CPC ...... H05B 45/34; H05B 45/35; H05B 45/375; H05B 45/382; H02J 7/0025; H02J 7/0068; H02J 9/062
See application file for complete search history.

(56) References Cited

U.S. PATENT DOCUMENTS 10,320,303 B1 * 6/2019 Xiong ................. H02M 1/4225
11,064,588 B1 * 7/2021 Xiong .................. H05B 45/382
11,923,712 B2 * 3/2024 Li ......................... H02J 7/0068
12,199,466 B2 * 1/2025 Beg ......................... H02J 3/381
2011/0133552 A1 * 6/2011 Binder .................... H02J 3/381 307/22
2016/0073457 A1 * 3/2016 Nakajo .................. H05B 45/10 315/223
2017/0079094 A1 * 3/2017 Okita ................... H02H 11/003

* cited by examiner

*Primary Examiner* — Tung X Le

(74) *Attorney, Agent, or Firm* — Ballard Spahr LLP

(57) ABSTRACT

Disclosed are a charge and discharge balancing circuit and an LED drive system, which include multiple charge and discharge branches, each of which includes a charge circuit and a discharge circuit. The charge and discharge branches are each connected to an energy storage device. The charge circuits are connected to a charging power supply, and the discharge circuits are connected to a load. Each charge and discharge branch determines whether to charge the connected energy storage device according to a voltage signal of the charging power supply and a voltage signal of the connected energy storage device, and determines whether to discharge to the connected load according to a voltage signal at a load connection terminal and the voltage signal of the connected energy storage device. The voltage signal at the load connection terminal is the maximum value among the voltages transmitted to the load by each branch.

20 Claims, 5 Drawing Sheets

CHARGE AND DISCHARGE BALANCING CIRCUIT AND LED DRIVE SYSTEM

CROSS-REFERENCE TO RELATED APPLICATIONS

This application claims priority to Chinese patent application No. 202311373571.5 filed with the Chinese Patent Office on Oct. 19, 2023, entitled "CHARGE AND DISCHARGE BALANCING CIRCUIT AND LED DRIVE SYSTEM", the entire contents of which are incorporated by reference.

TECHNICAL FIELD

The present disclosure relates to the field of charge and discharge, and in particular to a charge and discharge balancing circuit, and an LED drive system.

BACKGROUND

With the development of industry, electricity is being widely used in society, and the usage of batteries for storing electricity is also gradually expanding. One method is to use multiple batteries connected in parallel to supply power to an electric-powered device. In this method, multiple batteries are connected in parallel to form a battery pack to supply power to electric-powered devices, which can meet the needs of most electric-powered devices. Therefore, the method of charging and discharging through parallel-connected batteries is widely used due to its high applicability.

However, due to different models and types of batteries in a battery pack or different historical charge and discharge cycles, the output voltages of the batteries may be different, which will cause some batteries to be incompletely charged or incompletely discharged during charging and discharging, leading to insufficient durability and low charge and discharge efficiency of the battery pack.

SUMMARY

In a first aspect, the present disclosure provides a charge and discharge balancing circuit, which includes multiple charge and discharge branches, each of which further includes a charge circuit and a discharge circuit. The charge and discharge branches are each connected to an energy storage device, and the energy storage devices is connected to the charge circuit and the discharge circuit. The charge circuit of each charge and discharge branch is configured to connect to a charging power supply, and the discharge circuit of each charge and discharge branch is configured to connect to a load.

Each charge and discharge branch determines whether to charge the connected energy storage device according to a voltage signal of the charging power supply and a voltage signal of the connected energy storage device.

Each charge and discharge branch determines whether to discharge to the connected load according to a voltage signal at a load connection terminal and the voltage signal of the connected energy storage device. The voltage signal at the load connection terminal is a maximum value among the voltages transmitted to the load by the charge and discharge branches, respectively.

In some embodiments, the charge and discharge balancing circuit further includes a conditioning circuit connecting each of the charge circuits and the charging power supply. The conditioning circuit is configured to condition the voltage signal output by the charging power supply and then transmit the conditioned voltage signal to each of the charge circuits.

In some embodiments, the conditioning circuit includes a conditioning switch transistor and a current-limiting resistor. The control terminal of the conditioning switch transistor is connected to each of the charge circuits and the current-limiting resistor. The input terminal of the conditioning switch transistor is connected to the charging power supply. The output terminal of the conditioning switch transistor is grounded through the current-limiting resistor.

In some embodiments, the charging circuit includes a charging switch transistor, a voltage comparison switch transistor, and a pull-down resistor. The control terminal of the charging switch transistor is grounded through the pull-down resistor. The input terminal of the charging switch transistor is connected to the energy storage device and an input terminal of the voltage comparison switch transistor. The output terminal of the charging switch transistor is connected to the charging power supply. The control terminal of the voltage comparison switch transistor is connected to the charging power supply. The input terminal of the voltage comparison switch transistor is connected to the energy storage device. The output terminal of the voltage comparison switch transistor is grounded through the pull-down resistor.

In some embodiments, the discharge circuit includes a discharge control circuit and a discharge comparison circuit. The discharge control circuit is connected to the energy storage device, the load, and the discharge comparison circuit. The discharge comparison circuit is connected to the load.

In some embodiments, the discharge control circuit includes a discharge switch transistor, a voltage transmission switch transistor, and a first discharge resistor. A control terminal of the discharge switch transistor is connected to the discharge comparison circuit. An input terminal of the discharge switch transistor is connected to the load and the discharge comparison circuit. The output terminal of the discharge switch transistor is connected to the corresponding energy storage device and an input terminal of the voltage transmission switch transistor. A control terminal of the voltage transmission switch transistor is connected to the discharge comparison circuit and the first discharge resistor. An output terminal of the voltage transmission switch transistor is grounded through the first discharge resistor.

In some embodiments, the discharge comparison circuit includes a discharge comparison switch transistor and a second discharge resistor. A control terminal of the discharge comparison switch transistor is connected to the discharge control circuit, an input terminal of the discharge comparison switch transistor is connected to the discharge control circuit and the load, and an output terminal of the discharge comparison switch transistor is grounded through the second discharge resistor.

In some embodiments, the charge and discharge balancing circuit further includes a controller and an activation circuit. The activation circuit is connected to the discharge circuits, the controller, and the energy storage devices. The controller is connected to the energy storage devices. The activation circuit is configured to activate the energy storage devices under the control of the controller.

In some embodiments, the activation circuit includes a precharge circuit and a drive circuit. The precharge circuit is connected to a common terminal between the discharge circuits and the load. The precharge circuit is also connected to the controller and the drive circuit. The drive circuit is connected to the controller and the energy storage devices.

In some embodiments, the charge and discharge balancing circuit further includes a detection circuit connecting the controller and each of the energy storage devices.

In some embodiments, the charge and discharge balancing circuit further includes a switch circuit connecting the controller, the discharge circuit and the load.

In some embodiments, the charge and discharge balancing circuit further includes a step-down circuit connecting the controller and the discharge circuits.

In some embodiments, the charge and discharge balancing circuit further includes a buffer circuit connecting the charging power supply and the charging circuits.

In a second aspect, the present disclosure further provides an LED drive system. The LED drive system includes an LED constant current circuit, energy storage devices, and the above-mentioned charge and discharge balancing circuit. The charge and discharge balancing circuit connects the energy storage devices and the LED constant current circuit.

BRIEF DESCRIPTION OF THE DRAWINGS

In order to illustrate the technical solutions in the embodiments of the present disclosure or conventional technology more clearly, the accompanying drawings used in the description of the embodiments or prior art will be briefly introduced below. Apparently, the accompanying drawings in the following description are only some embodiments of the present disclosure. For those of ordinary skill in the art, other drawings can also be derived from these drawings without creative effort.

DETAILED DESCRIPTION OF THE EMBODIMENTS

Figure 1:
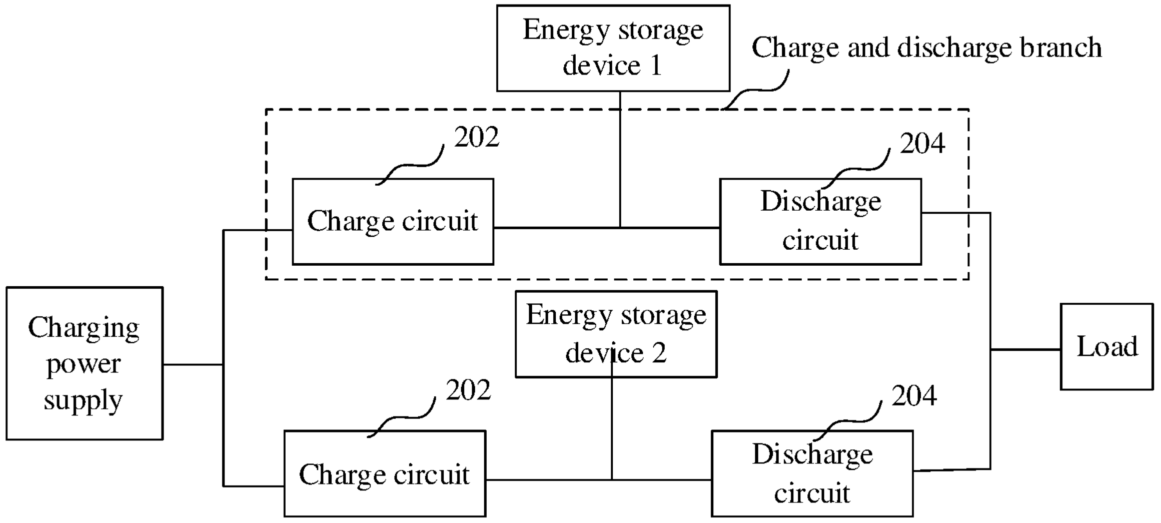
FIG. 1 is an application environment diagram of a charge and discharge balancing circuit according to an embodiment.

In order to facilitate understanding of the present disclosure, the present disclosure will be described more fully below with reference to related drawings. Embodiments of the present disclosure are presented in the drawings. However, the disclosure may be implemented in many different forms and is not limited to the embodiments described herein. Conversely, these embodiments are provided to make the disclosure more thorough and comprehensive.

It can be understood that the terms "first", "second", etc. used in the present disclosure may be used herein to describe various elements, but these elements are not limited by these terms. These terms are only used to distinguish a first element from another element. For example, a first resistor may be referred to as a second resistor, and similarly, a second resistor may be referred to as a first resistor, without departing from the scope of the present disclosure. The first resistor and the second resistor are both resistors, but they are not the same resistor.

It will be understood that "connected" in the following embodiments is to be interpreted as "electrically connected", "communicatively connected", etc. if electrical signals or data is transferred between the connected circuits, modules, units, etc.

It can be understood that "at least one" refers to one or more, and "multiple" refers to two or more. "At least part of an element" means part or all of an element.

As used herein, the singular forms "a," "an," and "this/the" may also include plural forms, unless otherwise clearly indicated. It should also be understood that the terms "comprising/including" or "having" and the like indicate the presence of the stated features, integers, steps, operations, components, parts or combinations thereof. However, these terms do not exclude the possibility of the presence or addition of one or more other features, integers, steps, operations, components, parts or combinations thereof. In addition, as the term "and/or" used in this description includes any and all combinations of the associated listed items.

Unless otherwise defined, all technical and scientific terms used herein have the same meaning as commonly understood by one of ordinary skill in the technical field to which the present disclosure belongs. The terms used herein in the description of the present disclosure are for the purpose of describing specific embodiments only and are not intended to limit the disclosure.

In a common load (usually an electric-powered device) that uses multiple parallel-connected energy storage devices for power supply, the energy storage devices used may be externally connected and can be replaced. The energy storage devices may also be pre-installed in the load. They are usually sealed and fixedly connected to the load, and are difficult to replace and dismantle. In either case mentioned above, energy storage devices will age as the number of charge and discharge cycles increases, the internal resistance will increase, the capacity will decrease, and the voltage will also decrease. Moreover, the aging degrees of the energy storage devices are not the same, that is, the voltages of the energy storage devices are different. For the energy storage devices pre-installed in the load, it is difficult to replace the aging energy storage devices. The energy storage devices are usually expanded by using external parallel-connected energy storage devices. For the externally connected energy storage devices, there are voltage differences between the externally connected energy storage devices, and there are also voltage differences between the new parallel-connected energy storage devices and the pre-installed energy storage devices in the load. In order to balance the charge and discharge processes of energy storage devices with different voltages, balance the power of the energy storage devices, and improve the charge and discharge efficiency of each energy storage device, a charge and discharge balancing circuit described in various embodiments of the present disclosure is provided herein to manage the charge and discharge process of each energy storage device.

An application environment of the charge and discharge balancing circuit is shown in FIG. 1. In some embodiments, the charge and discharge balancing circuit includes multiple charge and discharge branches, each of which further includes a charge circuit 202 and a discharge circuit 204. The charge and discharge branches are each connected to an energy storage device (such as an energy storage device 1, an energy storage device 2, an energy storage device n, etc., where n is a natural number greater than 2), and the energy storage device is connected to the corresponding charge circuit 202 and the corresponding discharge circuit 204. The charge circuit 202 of each charge and discharge branch is configured to connect to a charging power supply, and the discharge circuit 204 of each charge and discharge branch is configured to connect to a load. In fact, the number of charge and discharge branches is not limited. In FIG. 1, two charge and discharge branches are shown as an example.

A voltage signal at a load connection terminal is the maximum value among the voltages transmitted to the load by the charge and discharge branches, respectively. The load connection terminal is a common terminal between each discharge circuit 204 and the load, and can transmit the voltage of each discharge circuit 204. The voltage of the discharge circuit 204 with the highest voltage is the voltage of the load connection terminal. The charging power supply is a power supply that charges each energy storage device and is configured to replenish power for each energy storage device. The energy storage device is configured to be charged by the charging power supply under the control of the charge circuit 202 and discharge to the load under the control of the discharge circuit 204.

Specifically, the charge and discharge branch determines whether to charge the connected energy storage device according to the voltage signal of the charging power supply and the voltage signal of the connected energy storage device. The charge circuit 202 receives the voltage signal of the charging power supply and the voltage signal of the connected energy storage device, and determines whether to charge the connected energy storage device by comparing the voltages. The charge and discharge branch determines whether to discharge to the connected load according to the voltage signal at the load connection terminal and the voltage signal of the connected energy storage device. The discharge circuit 204 receives the voltage signal of the load connection terminal and the voltage signal of the connected energy storage device, and determines whether the energy storage device discharges to the connected load by comparing the voltages.

The circuit structures of the charge circuits 202 and the discharge circuits 204 are not limited and can be any components and related circuit structures that can achieve voltage comparison. For example, a charge circuit 202 includes a first voltage comparator, and the first voltage comparator determines whether to charge the connected energy storage device according to the voltage signal of the charging power source and the voltage signal of the connected energy storage device. The discharge circuit 204 includes a second voltage comparator, and the second comparator determines whether to discharge to the connected load according to the voltage signal of the load connection terminal and the voltage signal of the connected energy storage device.

In some embodiments, the charge circuit 202 includes a charging switch transistor, a voltage comparison switch transistor, and a pull-down resistor. The control terminal (e.g., the gate) of the charging switch transistor is grounded through the pull-down resistor. The input terminal (e.g., the source) of the charging switch transistor is connected to the energy storage device and the input terminal of the voltage comparison switch transistor. The output terminal (e.g., the drain) of the charging switch transistor is connected to the charging power supply. The control terminal (e.g., the base) of the voltage comparison switch transistor is connected to the charging power supply, the input terminal (e.g., the emitter) of the voltage comparison switch transistor is connected to the energy storage device, and the output terminal (e.g., the collector) of the voltage comparison switch transistor is grounded through the pull-down resistor.

Specifically, the voltage signal of the charging power supply is transmitted to the output terminal of the charging switch transistor and the control terminal of the voltage comparison switch transistor. The input terminal of the voltage comparison switch transistor is connected to the energy storage device to obtain the voltage signal of the energy storage device. The voltage comparison switch transistor compares the voltage signal of the charging power supply at the control terminal with the voltage signal of the energy storage device at the input terminal, and switches to the on state or the off state according to the comparison result. The on or off state of the voltage comparison switch transistor will affect the voltage at the control terminal of the charging switch transistor. When the voltage comparison switch transistor is in the on state, the control terminal of the charging switch transistor obtains the voltage signal of the energy storage device. When the voltage comparison switch transistor is in the off state, the control terminal of the charging switch transistor obtains a ground signal (i.e., zero voltage) through the pull-down resistor. The different voltage signals at the control terminal of the charging switch transistor correspondingly control the charging switch transistor to be in the on state or off state. When the charging switch transistor is in the on state, the charging power supply charges the connected energy storage device.

Figure 2:
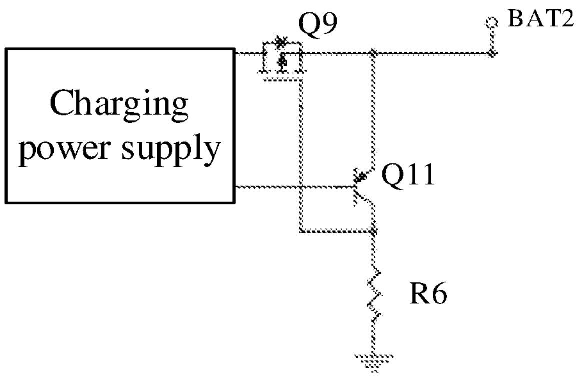
FIG. 2 is a circuit diagram of a charge circuit according to an embodiment.

Exemplarily, the circuit structure of the charge circuit 202 is shown in FIG. 2. The switch transistor Q9 is the charging switch transistor, the switch transistor Q11 is the voltage comparison switch transistor, and the resistor R6 is the pull-down resistor. When the switch transistor Q11 is cut off, the control terminal of the switch transistor Q9 is grounded through the resistor R6. When the switch transistor Q11 is turned on, the control terminal of the switch transistor Q9 is connected to the energy storage device BAT2 through the switch transistor Q11. The control terminal of the switch transistor Q11 is connected to the charging power supply, and whether the switch transistor Q11 is turned on is controlled according to the voltage signal of the charging power supply and the voltage signal of the energy storage device.

When the charging power supply starts to charge the energy storage devices, the voltage signal of the charging power supply will be pulled down by the energy storage device with the lowest voltage, so that the voltage signal of the charging power supply is closest to the voltage signal of the energy storage device with the lowest voltage. At this time, in the charge circuit 202 (as shown in FIG. 2) connected to the energy storage device with the lowest voltage, the voltage signals at the control terminal and the input terminal of the voltage comparison switch transistor are the same, which is not enough to generate a voltage difference to turn on the voltage comparison switch transistor, so the voltage comparison switch transistor is in the off state. Therefore, the control terminal of the charging switch transistor is grounded, the charging switch transistor is turned on, and the charging power supply charges the energy storage device with the lowest voltage. In each of the charge circuits 202 connected to other energy storage devices, the voltage comparison switch transistor is in the on state since there are voltage differences between the voltage signal at the control terminal and the input terminal of the voltage comparison switch transistor, so that the charging switch transistor is cut off.

For example, as shown in FIG. 2, the switch transistor Q9 is a PMOS transistor, and its model is JMTL3401A. The switch transistor Q11 is a PNP transistor, and its model is TK3906. The resistance value of the resistor R6 is 2 MΩ.

In this embodiment, the charge circuit 202 includes a charging switch transistor, a voltage comparison switch transistor, and a pull-down resistor. The voltage comparison switch transistor compares the voltage signal of the charging power supply with the voltage signal of the energy storage device to determine whether the energy storage device connected to the charge circuit 202 needs to be charged. The energy storage device with the lowest voltage is charged first, achieving charging balance and improving charging efficiency.

Figure 3:
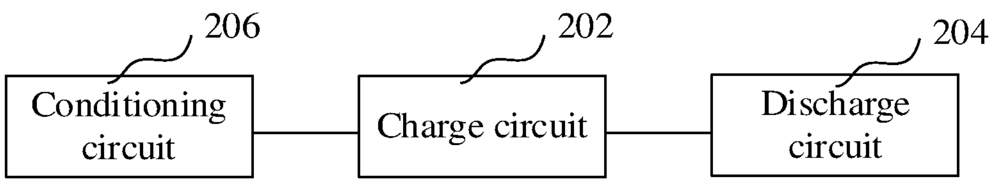
FIG. 3 is a schematic structural diagram of a charge and discharge balancing circuit according to an embodiment.

However, since the charge circuits 202 are directly connected to the charging power supply, there may be a risk of voltage breakdown or voltage fluctuation, which causes a control disorder in the charging circuit 202. In order to improve the stability of the charge and discharge balancing circuit and ensure that the voltage signal of the charging power supply is accurate and stable, in an embodiment, taking a charge and discharge branch in FIG. 3 as an example, the charge and discharge balancing circuit also includes a conditioning circuit 206. The conditioning circuit 206 connects to each charge circuit 202 and the charging power supply.

Specifically, the conditioning circuit 206 is configured to condition the voltage signal output by the charging power supply and then transmit the conditioned voltage signal to each charge circuit 202. The conditioning method of the conditioning circuit 206 is not limited, and the corresponding circuit structure is also not limited. For example, the conditioning circuit 206 may include a voltage regulator diode to stabilize the voltage signal from the charging power supply. The conditioning circuit 206 may also include a filter circuit to filter the voltage signal from the charging power supply. For example, when the charge circuit 202 is as shown in FIG. 2, the conditioning circuit 206 needs to be consistent with the voltage change or current change of the switch transistor Q11 to ensure that the switch transistor Q9 is not subjected to reverse current from the energy storage device and can be used normally.

It should be noted that, the conditioning circuit 206 can be provided between each charge circuit 202 and the charging power supply. Alternatively, only one conditioning circuit 206 is provided in the charge and discharge balancing circuit, and the conditioning circuit 206 connects between the charging power supply and charge circuits 202 in the multiple charge and discharge branches.

In some embodiments, the conditioning circuit 206 includes a conditioning switch transistor and a current-limiting resistor. The control terminal (e.g., the base) of the conditioning switch transistor is connected to each charge circuit 202 and the current-limiting resistor. The input terminal (e.g., the emitter) of the conditioning switch transistor is connected to the charging power supply. The output terminal (e.g., the collector) of the conditioning switch transistor is grounded through the current-limiting resistor.

Figure 4:
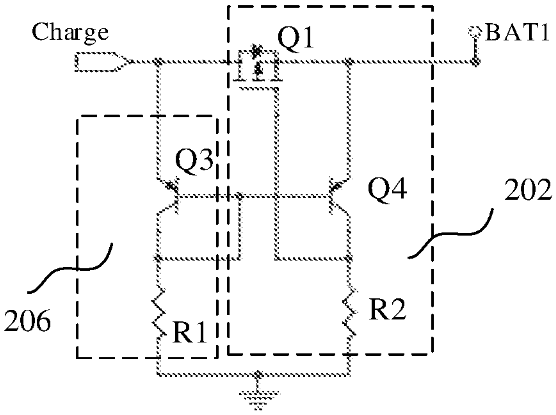
FIG. 4 is a circuit diagram of a conditioning circuit and a charge circuit according to an embodiment.

Specifically, the control terminal and the output terminal of the conditioning switch transistor are grounded through the current-limiting resistor. A charging voltage is input into the input terminal of the conditioning switch transistor. As shown in FIG. 4, in the conditioning circuit 206, the switch transistor Q3 is the conditioning switch transistor, and R1 is the current-limiting resistor. In the charge circuit 202, the switch transistor Q1 is the charging switch transistor, the switch transistor Q4 is the voltage comparison switch transistor, and the resistor R2 is the pull-down resistor. The charging power supply is labeled as Charge, and BAT1 represents the energy storage device connected to the charge circuit 202. The charge circuit 202 in FIG. 4 has the same structure as the charge circuit 202 in FIG. 2 and will not be repeated herein.

The switch transistor Q3 is a PNP transistor, and its model may be TK3906, for example. The resistance value of resistor R2 can be 2 MΩ. When there is no charging power supply connected, the control terminal (e.g., the base) of the switch transistor Q3 is grounded through the resistor R1, and the switch transistor Q3 is continuously on. When a charging power supply Charge is connected, the output terminal (e.g., the collector) of the switch transistor Q3 feeds back the voltage signal of the charging power supply to the control terminal of the switch transistor Q3. At the same time, the voltage signal of the charging power supply is also transmitted to the charge circuit 202, and at this time, the switch transistor Q3 is cut off.

In this embodiment, a conditioning circuit 206 is provided in the charge and discharge balancing circuit. The conditioning circuit 206 includes a conditioning switch transistor and a current-limiting resistor. One end of the current-limiting resistor is grounded. The current-limiting resistor and the conditioning switch transistor jointly stabilize the voltage signal of the charging power supply, reducing the probability that the charging power supply damages the charge circuit 202. In addition, the regulating switch transistor stabilizes the voltage signal of the charging power supply and then transmits it to the charge circuit 202, which can reduce the fluctuation of the voltage signal of the charging power supply and improve the accuracy and efficiency of the charge and discharge balancing circuit. Moreover, when the voltage of the energy storage device is too high and may damage the charging power supply, the conditioning switch transistor in the conditioning circuit 206 can prevent voltage backflow.

Figure 5:
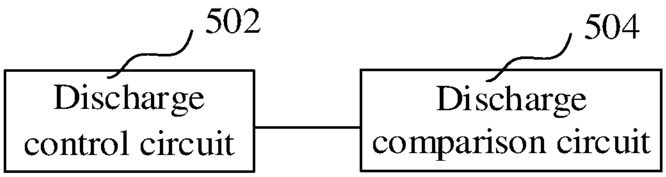
FIG. 5 is a schematic structural diagram of a discharge circuit according to an embodiment.

The circuit structure of the discharge circuit 204 is not limited. In an embodiment, as shown in FIG. 5, the discharge circuit 204 includes a discharge control circuit 502 and a discharge comparison circuit 504. The discharge control circuit 502 is connected to the energy storage device, the load, and the discharge comparison circuit 504. The discharge comparison circuit 504 is connected to the load.

Specifically, the discharge control circuit 502 is connected to the energy storage device and the load, and can transmit the electric energy from the connected energy storage device to the load, such that the energy storage device is discharged to supply power to the load. The discharge comparison circuit 504 is connected to the load and obtains the voltage signal of the load connection terminal. In addition, the discharge comparison circuit 504 obtains the voltage signal of the connected energy storage device through the discharge control circuit 502. The discharge comparison circuit 504 performs a voltage comparison between the voltage signal of the load connection terminal and the voltage signal of the connected energy storage device, and controls whether the discharge control circuit 502 is turned on according to the comparison result, thereby determining whether the connected energy storage device discharges to the load.

In some embodiments, the discharge control circuit 502 includes a discharge switch transistor, a voltage transmission switch transistor, and a first discharge resistor. The control terminal (e.g., the gate) of the discharge switch transistor is connected to the discharge comparison circuit 504. The input terminal (e.g., the source) of the discharge switch transistor is connected to the load and the discharge comparison circuit 504. The output terminal (e.g., the drain) of the discharge switch transistor is connected to the energy storage device and the input terminal of the voltage transmission switch transistor. The control terminal (e.g., the base) of the voltage transmission switch transistor is connected to the discharge comparison circuit 504 and the first discharge resistor. The output terminal (e.g., the collector) of the voltage transmission switch transistor is grounded through the first discharge resistor.

In some embodiments, the discharge comparison circuit 504 includes a discharge comparison switch transistor and a second discharge resistor. The control terminal (e.g., the base) of the discharge comparison switch transistor is connected to the discharge control circuit 502. The input terminal (e.g., the emitter) of the discharge comparison switch transistor is connected to the discharge control circuit 502 and the load. The output terminal (e.g., the collector) of the discharge comparison switch transistor is grounded through the second discharge resistor.

Figure 6:
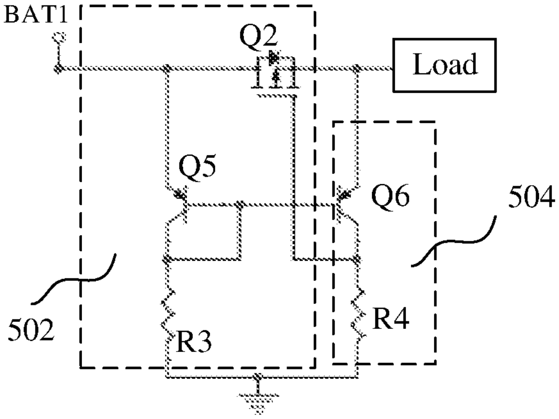
FIG. 6 is a circuit diagram of a discharge circuit according to an embodiment.

In order to explain the above embodiments in more detail, the following takes the discharge circuit 204 shown in FIG. 6 as an example for illustration. In an embodiment, the discharge circuit 204 is shown in FIG. 6. The energy storage device connected to the discharge control circuit 502 is BAT1. The discharge switch transistor of the discharge control circuit 502 is the switch transistor Q2, the voltage transmission switch transistor is the switch transistor Q5, and the first discharge resistor is the resistor R3. The discharge comparison switch transistor of the discharge comparison circuit 504 is Q6, and the second discharge resistor is R4.

The switch transistor Q5 and the switch transistor Q6 are PNP transistors. For example, the models of the switch transistor Q5 and the switch transistor Q6 can be TK3906. The switch transistor Q2 is a PMOS transistor. For example, the model of the switch transistor Q2 can be AON7409. The resistance value of the resistor R3 is 1 MΩ, and the resistance value of the resistor R4 is 2 MΩ.

Specifically, the control terminal of the switch transistor Q5 is grounded through the resistor R3, and the switch transistor Q5 is turned on. When the BAT1 discharges, the output terminal of the switch transistor Q5 feeds back the voltage signal of the energy storage device to the control terminal of the switch transistor Q5, and also transmits the voltage signal of the energy storage device to the control terminal of the switch transistor Q6 of the discharge comparison circuit 504. The switch transistor Q6 switches to the on state or the off state according to the voltage signal of the energy storage device at the control terminal and the voltage signal of the load connection terminal at the input terminal. When the switch transistor Q6 is in the on state, the voltage signal of the load connection terminal is transmitted to the control terminal of the switch transistor Q2 through the output terminal of the switch transistor Q6, and the switch transistor Q2 is cut off.

In this embodiment, the charge and discharge balancing circuit includes multiple charge circuits 202 and multiple discharge circuits 204. One charge circuit 202 and one discharge circuit 204 form a charge and discharge branch. The charge and discharge branches are each connected to an energy storage device. The energy storage device is connected to the charge circuit 202 and the discharge circuit 204. The charge circuit 202 of each charge and discharge branch is configured to connect to a charging power supply. The discharge circuit 204 of each charge and discharge branch is configured to connect to a load. The charge and discharge branch determines whether to charge the connected energy storage device according to the voltage signal of the charging power supply and the voltage signal of the connected energy storage device. The charge and discharge branch also determines whether to discharge to the connected load according to the voltage signal of the load connection terminal and the voltage signal of the connected energy storage device. The voltage signal at the load connection terminal is the maximum value among the voltages transmitted to the load by the charge and discharge branches. Through voltage comparison, the charge and discharge branch can determine whether to charge or discharge the connected energy storage device. The charge and discharge branch can charge the energy storage device with the lowest voltage and discharge the energy storage device with the highest voltage, achieving voltage balance between energy storage devices and improving the charge and discharge efficiency of the energy storage devices.

For the energy storage devices, some models of energy storage devices may include an overcurrent protection board, which is configured to control the energy storage device to stop working when the load current of the energy storage device is greater than the set current value of the overcurrent protection board. However, the set current values of some overcurrent protection boards are too low and unreasonable, leading to low charge and discharge efficiency of the battery pack. Therefore, in some embodiments, the charge and discharge balancing circuit also includes a controller and an activation circuit. The activation circuit is connected to the discharge circuits 204, the controller, and the energy storage devices. The controller is connected to the energy storage devices. The activation circuit is configured to activate the energy storage devices under the control of the controller.

Specifically, the controller connects to the energy storage devices, and obtains and analyzes the working state of the energy storage devices. When the working state of an energy storage device is a high current charging state (i.e., the current is relatively high, and the difference between the current value and the set current value of the overcurrent protection board is less than a warning value, where the warning value is a value set in the controller), the controller is in a warning state and sends a precharge signal to the activation circuit. The controller can also analyze the working state of the energy storage device to determine whether the energy storage device has entered the overcurrent protection state. When the energy storage device enters the overcurrent protection state, the controller sends an activation signal to the activation circuit. The activation signal cooperates with the precharge signal to control the activation circuit to activate the energy storage device.

Figure 7:
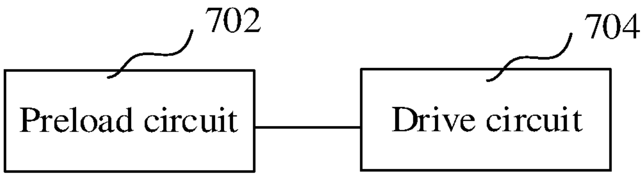
FIG. 7 is a schematic structural diagram of an activation circuit according to an embodiment.

In some embodiments, as shown in FIG. 7, the activation circuit includes a precharge circuit 702 and a drive circuit 704. The precharge circuit 702 is connected to the common terminal between the discharge circuits 204 and the load. The precharge circuit 702 is also connected to the controller and the drive circuit 704. The drive circuit 704 is connected to the controller and the energy storage devices.

Specifically, the precharge circuit 702 obtains the voltage signal output by the discharge circuit 204 (i.e., the voltage signal at the load connection terminal), and stores electric energy according to the precharge signal sent by the controller when the controller enters the warning state. Under the control of the activation signal sent by the controller, the drive circuit 704 receives the electric energy stored in the precharge circuit 702 and inputs the electric energy to the energy storage devices to activate the energy storage devices.

Figure 8:
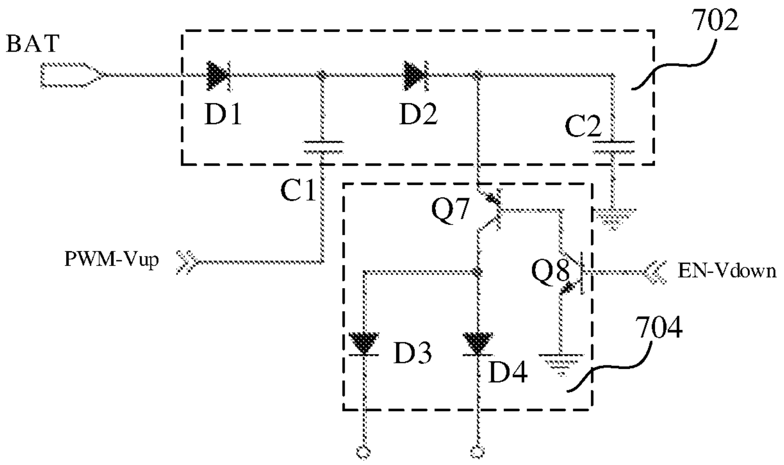
FIG. 8 is a schematic circuit diagram of an activation circuit according to an embodiment.

In some embodiments, the activation circuit is as shown in FIG. 8. The precharge circuit 702 includes a diode D1, a diode D2, a capacitor C1, and a capacitor C2. The drive circuit 704 includes a diode D3, a diode D4, a switch transistor Q7, and a switch transistor Q8. The voltage signal at the load connection terminal is labeled as BAT. The controller sends a precharge signal through the PWM-Vup port, and sends an activation signal through the EN-Vdown port. For example, the models of the diode D1, the diode D2, the diode D3 and the diode D4 are all RB520S. The switch transistor Q7 can be a PNP transistor with the model DTC143EE. The switch transistor Q8 can be an NPN transistor with the model DTC143EE. The capacitance value of the capacitor C1 can be 100 nF, and the capacitance value of the capacitor C2 can be 1 uF.

When the controller determines that overcurrent protection occurs in the energy storage device, it sends an activation signal to the switch transistor Q8 through the EN-Vdown port. The activation signal is a high level, the switch transistor Q8 is turned on, then the switch transistor Q7 is turned on, and the electric energy stored in the capacitor C2 of the precharge circuit 702 is transmitted to the energy storage devices through the diode D3 and the diode D4, so as to activate the energy storage devices. The number of the diodes (e.g., D3 and D4) is set to match the number of energy storage devices connected to the charge and discharge branches, and the diodes and the energy storage devices are connected in one-to-one correspondence.

In some embodiments, the charge and discharge balancing circuit also includes a detection circuit, which connects the controller and each energy storage device.

The detection circuit is configured to detect the working states of the energy storage devices, including the current values. The detection circuit may include a voltage dividing resistor to protect the controller. The controller obtains the working states of the energy storage devices through the detection circuit, which can protect the controller, make the working state detection of the energy storage devices more accurate, improve the accuracy of subsequent control, and thereby improve the efficiency of charging and discharging.

Figure 12:
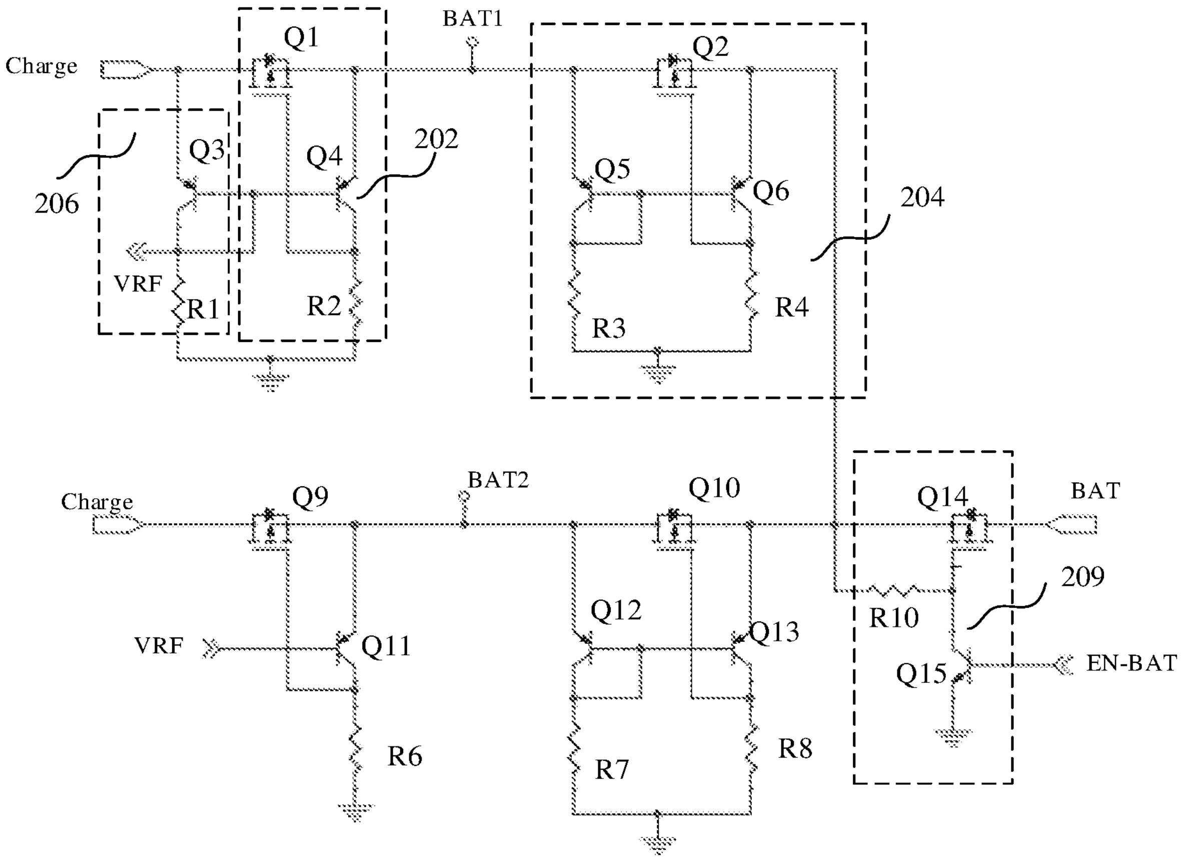
FIG. 12 is a schematic circuit diagram of a charge and discharge balancing circuit according to an embodiment.

In some embodiments, the charge and discharge balancing circuit also includes a switch circuit 209 (as shown in FIG. 12), which is connected to the controller, the discharge circuits 204, and the load.

Figure 9:
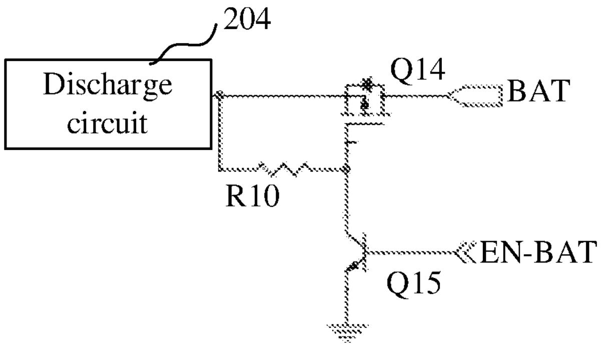
FIG. 9 is a schematic circuit diagram of a switch circuit according to an embodiment.

Through the switch circuit 209, the controller can control the connection and disconnection of the circuit between the discharge circuits 204 and the load, thereby controlling the output of the charge and discharge balancing circuit. In some embodiments, as shown in FIG. 9, the switch circuit includes a resistor R10, a switch transistor Q14, and a switch transistor Q15. The switch transistor Q14 can be a PMOS transistor with the model PE7170G, and the switch transistor Q15 can be an NPN transistor with the model DTC143EE. The controller sends different master control signals through the EN-BAT port to control the output of the discharge circuits 204. When the master control signal is at a low level, the switch transistor Q15 is cut off, the switch transistor Q14 is cut off, and the discharge circuits 204 has no output. When the master control signal is at a high level, the switch Q15 is turned on, the switch Q14 is turned on, and the discharge circuits 204 are connected to the load.

Figure 10:
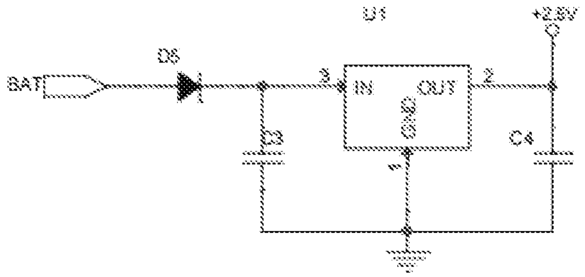
FIG. 10 is a schematic circuit diagram of a step-down circuit according to an embodiment.

In some embodiments, the charge and discharge balancing circuit also includes a step-down circuit connecting the controller and the discharge circuits 204. The step-down circuit is configured to reduce and stabilize the voltage output by the discharge circuit 204 and then supply power to the controller. As shown in FIG. 10, the step-down circuit includes a diode D5, a step-down chip U1, a capacitor C3, and a capacitor C4. For example, the model of the diode D5 is RB520S, the model of the step-down chip U1 is XC6205-25, the rated parameters of the capacitor C3 are 10 uF/16V, and the rated parameters of the capacitor C4 are 22 uF/6.3V. The capacitor C4 can provide emergency power supply to the controller when the voltage output by the discharge circuit 204 suddenly disappears (for example, during overcurrent protection).

In some embodiments, the charge and discharge balancing circuit also includes a buffer circuit connecting the charging power supply and the charging circuits 202. The buffer circuit is configured for rectifying and adjusting the output voltage of the charging power supply, so that the voltage received by the charging circuit 202 matches the voltage tolerance of the energy storage device during charging.

Based on the same inventive concept, in some embodiments, the present disclosure also provides an LED drive system. The LED drive system includes an LED constant current circuit, energy storage devices, and a charge and discharge balancing circuit as described in the above embodiments. The charge and discharge balancing circuit connects the energy storage devices and the LED constant current circuit.

Figure 11:
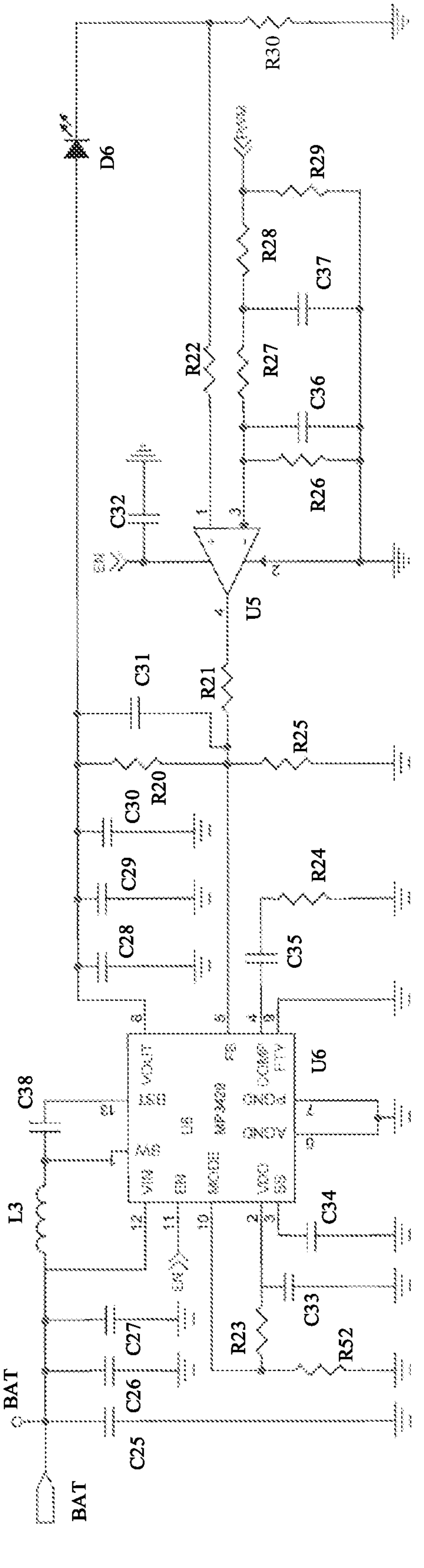
FIG. 11 is a schematic circuit diagram of an LED constant current circuit according to an embodiment.

The energy storage devices supply power to the LED constant current circuit through the charge and discharge balancing circuit. In some embodiments, as shown in FIG. 11, the LED constant current circuit includes capacitors C25-C38, resistors R20-R30 and R52, a boost chip U6, an inductor L3, an operational amplifier U5, and a light-emitting diode D6. The working state of the LED constant current circuit is controlled through an EN port of a processor. The light intensity is controlled and adjusted through a PWM port of the processor. Optionally, the processor may be the controller in the charge and discharge balancing circuit. Under the regulation of the charge and discharge balancing circuit, the outputs of the energy storage devices continue to be stable and the discharge is balanced, making the LED drive system stable.

In some embodiments, the LED drive system further includes a charging power supply for charging the energy storage devices through the charge and discharge balancing circuit.

In order to better understand the above solution, a detailed explanation will be given below with a specific embodiment in conjunction with the application scenario shown in FIG. 1.

In an embodiment, the LED drive system includes an LED constant current circuit, energy storage devices, a charging power supply, and a charge and discharge balancing circuit. The LED constant current circuit is as shown in FIG. 11. The voltage output by the charging power supply is labeled as Charge. The energy storage devices include BAT1 and BAT2, both of which are batteries. The charge and discharge balancing circuit includes charge circuits, discharge circuits, a controller, a conditioning circuit, an activation circuit, a detection circuit, a switch circuit, and a step-down circuit. The charge circuits 202, the discharge circuits 204, the conditioning circuit 206, and the switch circuit 209 are shown in FIG. 12. The specific circuit structure and component composition are described in the above embodiments and will not be repeated herein. The conditioning circuit 206 is connected to each charging circuit 202 through the VRF interface. It should be noted that since the voltage Charge output by the charging power supply is the same for all charge circuits, the switch transistor Q3 can transmit the voltage Charge to each charge circuit through the base, such that the switch transistor Q3 can be used as a common switch transistor for all charge circuits. However, in the discharge circuits, the voltage of BAT1 obtained by the switch transistor Q5 is different from the voltage of BAT2 obtained by the switch transistor Q12, so it is necessary to set a separate switch transistor (such as the switch transistor Q5 and the switch transistor Q12) for each discharge circuit.

In the case that the voltage of BAT1 is greater than the voltage of BAT2, in the initial state, the current of BAT1 flows through the emitter and base of the switch transistor Q4 (PNP transistor) to the current-limiting resistor R1 to form a loop. The switch transistor Q4 (PNP transistor) is turned on, the voltage of the gate (G) of Q1 (PMOS transistor) is pulled up, and the switch transistor Q1 (PMOS transistor) is cut off. The same principle applies to BAT2, and the same principle applies when the number of the energy storage devices is one or more.

During charging, when there is a charging voltage (Charge) at the drain (D) of the switch transistor Q1 (PMOS transistor) and the drain (D) of the switch transistor Q9 (PMOS transistor), the current flows through the body diode of the switch transistor Q9 (PMOS transistor) to charge the energy storage device with the lowest voltage, and the charging voltage at the drain (D) drops (equal to the voltage of the battery BAT2 plus the voltage of the body diode). The body diode of the switch transistor Q1 (PMOS transistor) cannot be turned on, the current flows through the emitter and base of the switch transistor Q3 (PNP transistor) to the resistor R1 (current-limiting resistor) to form a loop. The switch transistor Q3 (PNP transistor) is turned on, the voltage at the base of the switch transistor Q3 (PNP transistor) rises, that is, the voltage at the base of the switch transistor Q11 (PNP transistor) rises. The voltage difference between the emitter and the base of the switch transistor Q11 (PNP transistor) does not meet the conduction condition, thus the switch transistor Q11 (PNP transistor) triode) is cut off. Since the collector of the switch transistor Q11 (PNP transistor) is at low potential (i.e., the gate of the switch transistor Q9 is at low potential), the switch transistor Q9 (PMOS transistor) is turned on, BAT2 starts to be charged. At this time, the voltages at the drain (D) of the switch transistor Q1 (PMOS transistor) and the drain of the switch transistor Q9 (PMOS transistor) are equal to the voltage of BAT2 plus the voltage of the switch transistor Q9 (PMOS transistor), and are less than the voltage of BAT1. The body diode of the switch transistor Q1 (PMOS transistor) is cut off, the voltages of the emitter and base of the switch transistor Q4 (PNP transistor) still meet the conduction condition, the collector of the switch transistor Q4 (PNP transistor) is at high potential, and the switch transistor Q1 (PMOS transistor) is cut off.

Conversely, the same principle applies when the voltage of BAT2 is greater than that of BAT1, and the same principle applies when the number of the energy storage devices is one or more. When the voltage of BAT1 is equal to that of BAT2, the voltages of the emitter and base of the switch transistor Q4 (PNP transistor) and the voltages of the emitter and base of the switch transistor Q11 (PNP transistor) do not meet the conduction condition, the gate (G) of the switch transistor Q1 (PMOS transistor) and the gate of the switch transistor Q9 (PMOS transistor) are at low potential, thus the switch transistor Q1 (PMOS transistor) and the switch transistor Q9 (PMOS transistor) are turned on (charged).

In the case that the voltage of BAT1 is greater than that of BAT2, during discharging, the current flows through the emitter and base of the switch transistor Q5 to the resistor R3 (the first discharge resistor) to form a loop. The switch transistor Q5 (PNP transistor) is turned on. The gate (G) of the switch transistor Q2 (PMOS transistor) is initially at a low potential, and the switch transistor Q2 (PMOS transistor) is in the on state (discharge). After the current flows through the switch transistor Q2, there is a voltage difference between the two ends of the switch transistor Q2, in other words, the voltage of BAT (the output voltage, i.e., the voltage at the load connection terminal) is less than the voltage of BAT1. The voltage between the emitter and the base of the switch transistor Q6 (PNP transistor) does not meet the conduction condition, the switch transistor Q6 (PNP transistor) is cut off, i.e., the collector of the switch transistor Q6 (PNP transistor) is at a low potential, and the switch transistor Q2 (PMOS transistor) is maintained in the on state (discharge). The current of BAT flows through the emitter and base of the switch transistor Q13 (PNP transistor) to the resistor R7 (first discharge resistor) to form a loop. The switch transistor Q13 (PNP transistor) is turned on, and the current of BAT flows through the emitter and collector of the switch transistor Q13 (PNP transistor) to R8 (second discharge resistor) to form a loop, the collector of the switch transistor Q13 (i.e., the gate of the switch transistor Q10) is at a high potential, and the switch transistor Q10 (PMOS transistor) is cut off. The same principle applies during charging when the voltage of BAT2 is greater than that of BAT1.

In the case that the voltage of BAT1 is equal to that of BAT2, the voltages of the emitter and base of the switch transistor Q4 (PNP transistor) and the voltages of the emitter and base of the switch transistor Q13 (PNP transistor) do not meet the conduction conditions, the gate (G) of the switch transistor Q2 (PMOS transistor) and the gate (G) of the switch transistor Q10 (MOS) are at a low potential, and the switch transistor Q1 (PMOS transistor) and the switch transistor Q9 (PMOS transistor) are turned on (discharged).

The controller is a SC92L8532 microcontroller (MCU) with 20 pins, pin 6 of which is connected to a button to detect whether the button is pressed. Pin 10 is connected to BAT2 through the detection circuit, and pin 14 is connected to BAT1 through the detection circuit, so as to detect the working states of the energy storage devices. Pin 11 is connected to the PWM port and outputs the PWM signal to the LED constant current circuit. Pin 15 is connected to the EN port to output the signal. Pin 16 is connected to the EN-Vdown port. Pin 17 is connected to the PWM-Vup port. Pin 16 and Pin 17 are configured to connect the activation circuit to activate the energy storage devices. Pin 18 is connected to the EN-BAT port and connected to the switch circuit.

When the controller detects that the LED constant current circuit is operating at the maximum power, or detects that the current of the energy storage device reaches the set warning value, pin 17 of the MCU sends out a PWM signal with 1 KHz-50% duty cycle, causing the voltage at the other end of the bootstrap capacitor C1 to be raised. At this time, the capacitor C1 charges the C2 capacitor through the D2 diode to store energy. When overcurrent protection occurs, the voltage of BAT1 or BAT2 drops to 0V, and the MCU detects the voltages of BAT1 and BAT2 through the detection circuit. When the MCU detects that the voltage of BAT1 or BAT2 drops beyond a certain value, pin 16 of the MCU outputs a high level for 1 ms, causing the switch transistor Q8 (NPN transistor) to be turned on. At the same time, pin 18 of the MCU outputs a low level, causing the switch transistor Q15 (NPN) to cut off, such that the collector of the switch transistor Q15 (i.e., the gate of switch transistor Q14 (PMOS transistor)) becomes a high potential, and the switch transistor Q14 (PMOS transistor) is cut off. The current at both ends of the capacitor C2 forms a loop through the emitter and base of the switch transistor Q7 (PNP transistor) and the collector and emitter of the switch transistor Q8 (NPN transistor), causing the switch transistor Q7 (PNP transistor) to turn on, and the current at both ends of C2 passes through the emitter and collector of the switch transistor Q7 (PNP transistor), D3 (diode) or D4 (diode) to activate BAT1 or BAT2. When detecting that the energy storage devices are activated, pin 18 outputs a high level to maintain power supply to the load.

In this embodiment, the charging and discharging of each energy storage device do not affect each other, and the charging and discharging impedance is extremely low. The battery can be replaced at will. The service life of the battery is extended, and the charge and discharge efficiency of the battery is maintained at a high level. In addition, in this embodiment, the battery can also be activated to continued to be used when the battery experiences overcurrent protection, so as to provide a continuous and stable supply power to the load.

In the description of this specification, reference to the description of the terms "some embodiments", "other embodiments," etc. is intended to indicate that a specific feature, configuration, material, or characteristic described in connection with the embodiments or examples are included in at least one embodiment or example of the present disclosure. In this specification, schematic descriptions of the above terms do not necessarily refer to the same embodiment or example.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope recorded in this specification.

The above-mentioned embodiments only illustrate several embodiments of the present disclosure, and the descriptions of which are relatively specific and detailed, but should not be construed as limitations to the scope of the present disclosure. It should be noted that, for those skilled in the art, variations and improvements can be made without departing from the concept of the present disclosure, which all belong to the protection scope of the present disclosure. Therefore, the protection scope of the present disclosure shall be subject to the appended claims.

What is claimed is:

1. A charge and discharge balancing circuit, comprising:

multiple charge and discharge branches, each of which further comprises a charge circuit and a discharge circuit, the charge and discharge branches are each connected to an energy storage device, the energy storage device is connected to the corresponding charge circuit and the corresponding discharge circuit, the charge circuit of each charge and discharge branch is configured to connect to a charging power supply, and the discharge circuit of each charge and discharge branch is configured to connect a load;

wherein each charge and discharge branch is configured to:

determine whether to charge the connected energy storage device according to a voltage signal of the charging power supply and a voltage signal of the connected energy storage device; and determine whether to discharge to the connected load according to a voltage signal at a load connection terminal and the voltage signal of the connected energy storage device, wherein the load connection terminal is a common terminal between each discharge circuit and the load, and the voltage signal at the load connection terminal is a maximum value among the voltages transmitted to the load by the charge and discharge branches, respectively.

2. The charge and discharge balancing circuit according to claim 1, further comprising a conditioning circuit connecting each of the charge circuits and the charging power supply, wherein the conditioning circuit is configured to condition a voltage signal output by the charging power supply and then transmit the conditioned voltage signal to each of the charge circuits.

3. The charge and discharge balancing circuit according to claim 2, wherein the conditioning circuit comprises a conditioning switch transistor and a current-limiting resistor, a control terminal of the conditioning switch transistor is connected to each of the charge circuits and the current-limiting resistor, an input terminal of the conditioning switch transistor is connected to the charging power supply, and an output terminal of the conditioning switch transistor is grounded through the current-limiting resistor.

4. The charge and discharge balancing circuit according to claim 1, wherein each charge circuit comprises a charging switch transistor, a voltage comparison switch transistor, and a pull-down resistor;

wherein a control terminal of the charging switch transistor is grounded through the pull-down resistor, an input terminal of the charging switch transistor is connected to the energy storage device and an input terminal of the voltage comparison switch transistor, an output terminal of the charging switch transistor is connected to the charging power supply, an control terminal of the voltage comparison switch transistor is connected to the charging power supply, the input terminal of the voltage comparison switch transistor is connected to the energy storage device, and an output terminal of the voltage comparison switch transistor is grounded through the pull-down resistor.

5. The charge and discharge balancing circuit according to claim 1, wherein each discharge circuit comprises a discharge control circuit and a discharge comparison circuit, the discharge control circuit is connected to the energy storage device, the load, and the discharge comparison circuit, and the discharge comparison circuit is connected to the load.

6. The charge and discharge balancing circuit according to claim 5, wherein the discharge control circuit comprises a discharge switch transistor, a voltage transmission switch transistor, and a first discharge resistor;

wherein a control terminal of the discharge switch transistor is connected to the discharge comparison circuit, an input terminal of the discharge switch transistor is connected to the load and the discharge comparison circuit, the output terminal of the discharge switch transistor is connected to the corresponding energy storage device and an input terminal of the voltage transmission switch transistor, a control terminal of the voltage transmission switch transistor is connected to the discharge comparison circuit and the first discharge resistor, and an output terminal of the voltage transmission switch transistor is grounded through the first discharge resistor.

7. The charge and discharge balancing circuit according to claim 6, wherein the discharge comparison circuit comprises a discharge comparison switch transistor and a second discharge resistor;

wherein a control terminal of the discharge comparison switch transistor is connected to the discharge control circuit, an input terminal of the discharge comparison switch transistor is connected to the discharge control circuit and the load, and an output terminal of the discharge comparison switch transistor is grounded through the second discharge resistor.

8. The charge and discharge balancing circuit according to claim 1, further comprising a controller and an activation circuit, wherein the activation circuit is connected to the discharge circuits, the controller, and the energy storage devices, the controller is connected to the energy storage devices, and the activation circuit is configured to activate the energy storage devices under a control of the controller.

9. The charge and discharge balancing circuit according to claim 8, wherein the activation circuit comprises a precharge circuit and a drive circuit, the precharge circuit is connected to a common terminal between the discharge circuits and the load, the precharge circuit is also connected to the controller and the drive circuit, and the drive circuit is connected to the controller and the energy storage devices.

10. The charge and discharge balancing circuit according to claim 8, further comprising a detection circuit connecting the controller and each of the energy storage devices.

11. The charge and discharge balancing circuit according to claim 8, further comprising a switch circuit connecting the controller, the discharge circuits, and the load.

12. The charge and discharge balancing circuit according to claim 8, further comprising a step-down circuit connecting the controller and the discharge circuits.

13. The charge and discharge balancing circuit according to claim 1, further comprising a buffer circuit connecting the charging power supply and the charging circuits.

14. An LED drive system, wherein the LED drive system comprises an LED constant current circuit, the energy storage devices, and the charge and discharge balancing circuit according to claim 1, and the charge and discharge balancing circuit connects the energy storage devices and the LED constant current circuit.

15. The LED drive system according to claim 14, wherein the charge and discharge balancing circuit further comprises a conditioning circuit connecting each of the charge circuits and the charging power supply, and the conditioning circuit is configured to condition a voltage signal output by the charging power supply and then transmit the conditioned voltage signal to each of the charge circuits.

16. The LED drive system according to claim 15, wherein the conditioning circuit comprises a conditioning switch transistor and a current-limiting resistor;

wherein a control terminal of the conditioning switch transistor is connected to each of the charge circuits and the current-limiting resistor, an input terminal of the conditioning switch transistor is connected to the charging power supply, and the output terminal of the conditioning switch transistor is grounded through the current-limiting resistor.

17. The LED drive system according to claim 14, wherein each charge circuit comprises a charging switch transistor, a voltage comparison switch transistor, and a pull-down resistor;

wherein a control terminal of the charging switch transistor is grounded through the pull-down resistor, an input terminal of the charging switch transistor is connected to the energy storage device and an input terminal of the voltage comparison switch transistor, an output terminal of the charging switch transistor is connected to the charging power supply; and wherein a control terminal of the voltage comparison switch transistor is connected to the charging power supply, the input terminal of the voltage comparison switch transistor is connected to the energy storage device, and an output terminal of the voltage comparison switch transistor is grounded through the pull-down resistor.

18. The LED drive system according to claim 14, wherein each discharge circuit comprises a discharge control circuit and a discharge comparison circuit, the discharge control circuit is connected to the energy storage device, the load, and the discharge comparison circuit, and the discharge comparison circuit is connected to the load.

19. The LED drive system according to claim 14, wherein the charge and discharge balancing circuit further comprises a controller and an activation circuit, the activation circuit is connected to the discharge circuits, the controller, and the energy storage devices, the controller is connected to the energy storage devices, and the activation circuit is configured to activate the energy storage devices under a control of the controller.

20. The LED drive system according to claim 19, wherein the activation circuit comprises a precharge circuit and a drive circuit, the precharge circuit is connected to a common terminal between the discharge circuits and the load, the precharge circuit is also connected to the controller and the drive circuit, and the drive circuit is connected to the controller and the energy storage devices.

* * * * *